United States Patent
Sato

[11] Patent Number: 6,157,337
[45] Date of Patent: Dec. 5, 2000

[54] 3D IMAGE ACQUIRING AND VIEWING SYSTEMS AND METHODS

[75] Inventor: Robert Jay Sato, Fort Lee, N.J.

[73] Assignees: Sony Corporation, Tokyo, Japan; Sony Electronics, Inc., Del.

[21] Appl. No.: 09/239,795

[22] Filed: Jan. 29, 1999

[51] Int. Cl.[7] .................................................. H03M 1/12
[52] U.S. Cl. ........................................ 341/155; 345/419
[58] Field of Search .................................. 341/155, 156, 341/165; 358/474, 475; 382/254, 154; 345/419

[56] References Cited

U.S. PATENT DOCUMENTS

| | | | |
|---|---|---|---|
| 4,678,298 | 7/1987 | Perisic | 352/62 |
| 4,881,122 | 11/1989 | Mrakami | 358/88 |
| 4,905,081 | 2/1990 | Morton | 358/88 |
| 5,262,867 | 11/1993 | Kojima | 358/209 |
| 5,475,419 | 12/1995 | Carbery | 348/59 |
| 5,661,518 | 8/1997 | Palm et al. | 348/42 |
| 5,727,242 | 3/1998 | Lo et al. | 396/324 |
| 5,852,753 | 12/1998 | Lo et al. | 396/328 |
| 5,898,508 | 4/1999 | Bekanich | 358/474 |
| 5,966,132 | 10/1999 | Kakizawa et al. | 345/419 |
| 6,064,775 | 5/2000 | Suzuki et al. | 382/254 |

*Primary Examiner*—Brian Young
*Attorney, Agent, or Firm*—Finnegan, Henderson, Farabow, Garrett & Dunner, L.L.P.

[57] ABSTRACT

A three-dimensional image acquiring system includes a memory, first and second lens systems, a comparator, and an image file generator. The first lens system captures a first image of an object and the second lens system concurrently captures a second image of the object. The comparator compares the first and second images to determine differences between them. The image file generator generates a delta file based on the determined differences, and stores a three-dimensional image file that includes the delta file in the memory. A three-dimensional image viewing system reconstructs the second image from the first image and the delta file and presents the first and second images for viewing by a user.

43 Claims, 8 Drawing Sheets

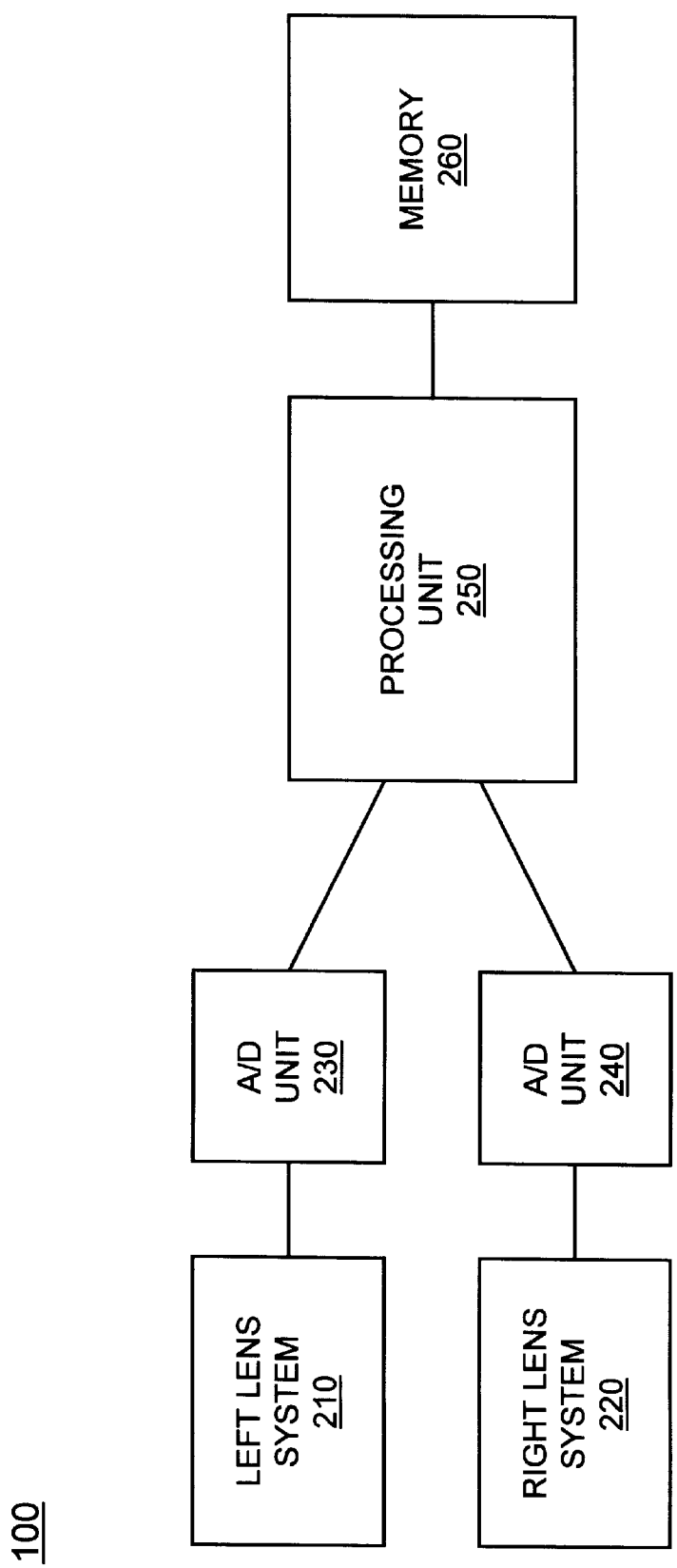

800
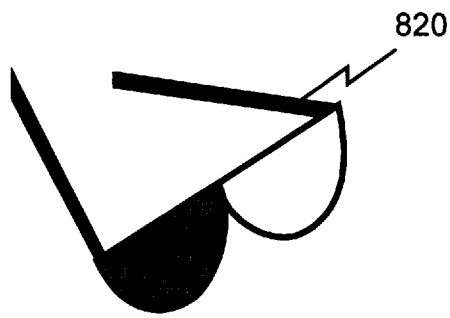
820
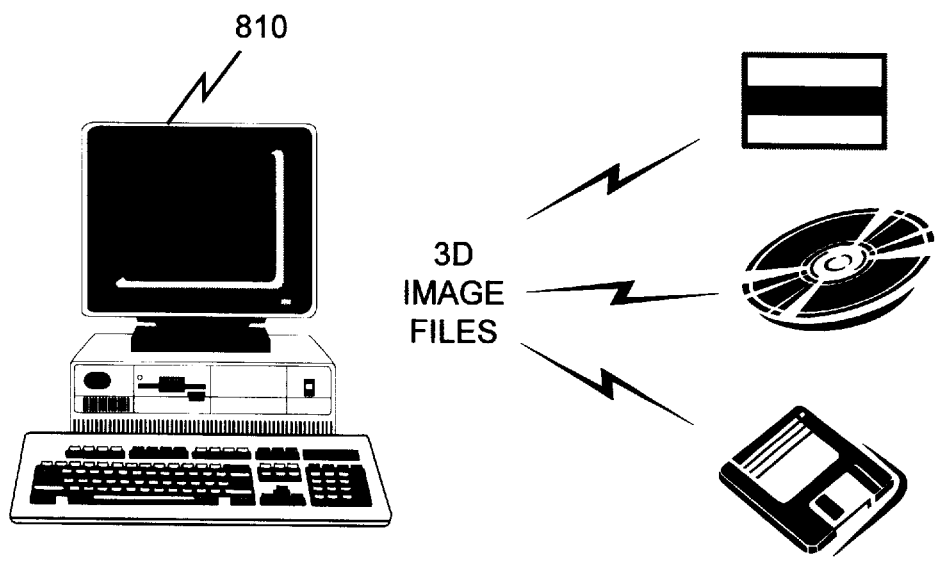
810
3D IMAGE FILES
FIG. 8

3D IMAGE ACQUIRING AND VIEWING SYSTEMS AND METHODS

FIELD OF THE INVENTION

The present invention relates generally to digital imaging and, more particularly, to a system that provides an efficient mechanism for storing and recreating three-dimensional images.

DESCRIPTION OF RELATED ART

Many kinds of cameras have been used to record a reproducible image of an object on a recording medium. Recently, electronic cameras have increased in popularity. Electronic cameras record a digital image of an object on a recording medium, such as a floppy disk, a recordable disk, and/or a memory card.

To record three-dimensional ("3D") images, however, specialized cameras have conventionally been used. These specialized cameras typically include modified photographic cameras with twin sets of camera lenses, spaced at a distance equivalent to the average separation between the left and right eyes of a human (e.g., 3 to 3.5 inches). The cameras record two separate images, one by the left lens and one by the right lens, and store these images as separate files. This leads to storage inefficiencies due to the typically large size of the image files.

To view the 3D image, some conventional systems use a stereoscopic viewer. The stereoscopic viewer uses two discrete images (i.e., the left and right images) placed side by side. The viewer transmits the left image to the left eye of a user and the right image to the right eye. The combination of the left and right images reconstruct the 3D effect of the image for the user.

Another conventional system generates a composite image from the left and right images and uses polarized red/green filters to separate the composite image into discrete right eye and left eye image information. A user requires special glasses with a red filter (for the right eye) and a green filter (for the left eye) to observe the 3D effect of the composite image.

Therefore, a need exists for a system and method to efficiently store and recreate the left and right images to produce a 3D effect.

SUMMARY OF THE INVENTION

Systems and methods consistent with the present invention address this need by capturing left and right images of a 3D image and storing the 3D image as a right image file and a corresponding delta file. The right image file stores information regarding the right image. The delta file stores information regarding only the differences between the left and right images. In this way, the 3D images are stored in an efficient manner over conventional systems.

When viewing the 3D images, the systems and methods reconstruct the left image from the right image and the corresponding delta file, and present the left and right images for viewing by a user.

In accordance with the purpose of the invention as embodied and broadly described herein, a three-dimensional image acquiring system includes a memory, first and second lens systems, a comparator, and an image file generator. The first lens system captures a first image of an object and the second lens system concurrently captures a second image of the object. The comparator compares the first and second images to determine differences between them. The image file generator generates a delta file based on the determined differences, and stores a three-dimensional image file that includes the delta file in the memory. A three-dimensional image viewing system reconstructs the second image from the first image and the delta file and presents the first and second images for viewing by a user.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

FIG. 2 is an exemplary block diagram of components of the electronic camera of FIG. 1;

FIG. 8 is an exemplary diagram of an alternative system for viewing a 3D image in a manner consistent with the present invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide an efficient mechanism for storing and recreating a 3D image. The mechanism separately acquires a right eye image and a left eye image, determines the differences between the images, and stores a 3D image file as a right eye image file and a corresponding delta file. The delta file includes only the differences between the right and left eye images. To recreate the 3D image, the mechanism recreates the left eye image from the right eye image file and corresponding delta file, and presents the left and right eye images to the user.

EXEMPLARY 3D IMAGE ACQUIRING DEVICE

Figure 1:
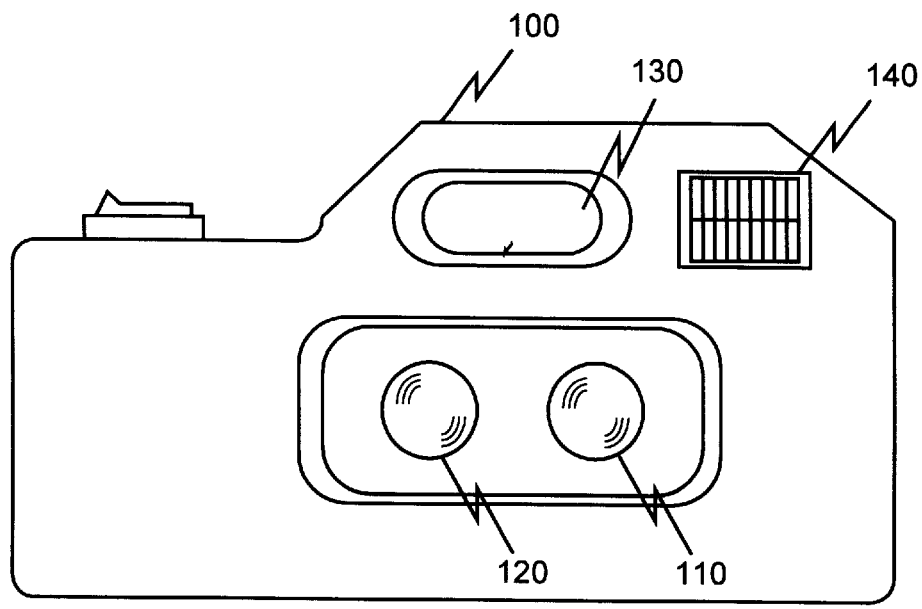
FIG. 1 is a diagram of an exemplary electronic camera consistent with the present invention.

FIG. 1 is a diagram of a 3D image acquiring device in the form of a dual-lens electronic camera 100. The camera 100 includes two lenses, a left eye lens 110 and a right eye lens 120, a viewer-finder 130, and an electronic flash 140. The left and right eye lenses 110 and 120 are spaced at a distance equivalent to the average separation between the left and right eyes of a human (e.g., 3 to 3.5 inches), and include conventional components to acquire an image of an object.

The left and right eye lenses 110 and 120 concurrently obtain separate images of the same object.

The view-finder 130 provides a mechanism through which a user can see the field of view of the left and right eye lenses 110 and 120. The electronic flash 140 provides adequate lighting when necessary.

EXEMPLARY COMPONENTS OF THE 3D IMAGE ACQUIRING DEVICE

FIG. 2 is an exemplary block diagram of components of the electronic camera 100. The camera 100 includes left and right lens systems 210 and 220, analog-to-digital (A/D) units 230 and 240, processing unit 250, and memory 260.

The left and right lens systems 210 and 220 contain identical components to acquire two separate analog images (left and right eye images) of an object. The A/D units 230 and 240 connect to the left and right lens systems 210 and 220, respectively, to convert the analog images to digital images. The processing unit 250 receives the digital images from the A/D units 230 and 240.

Figure 3:
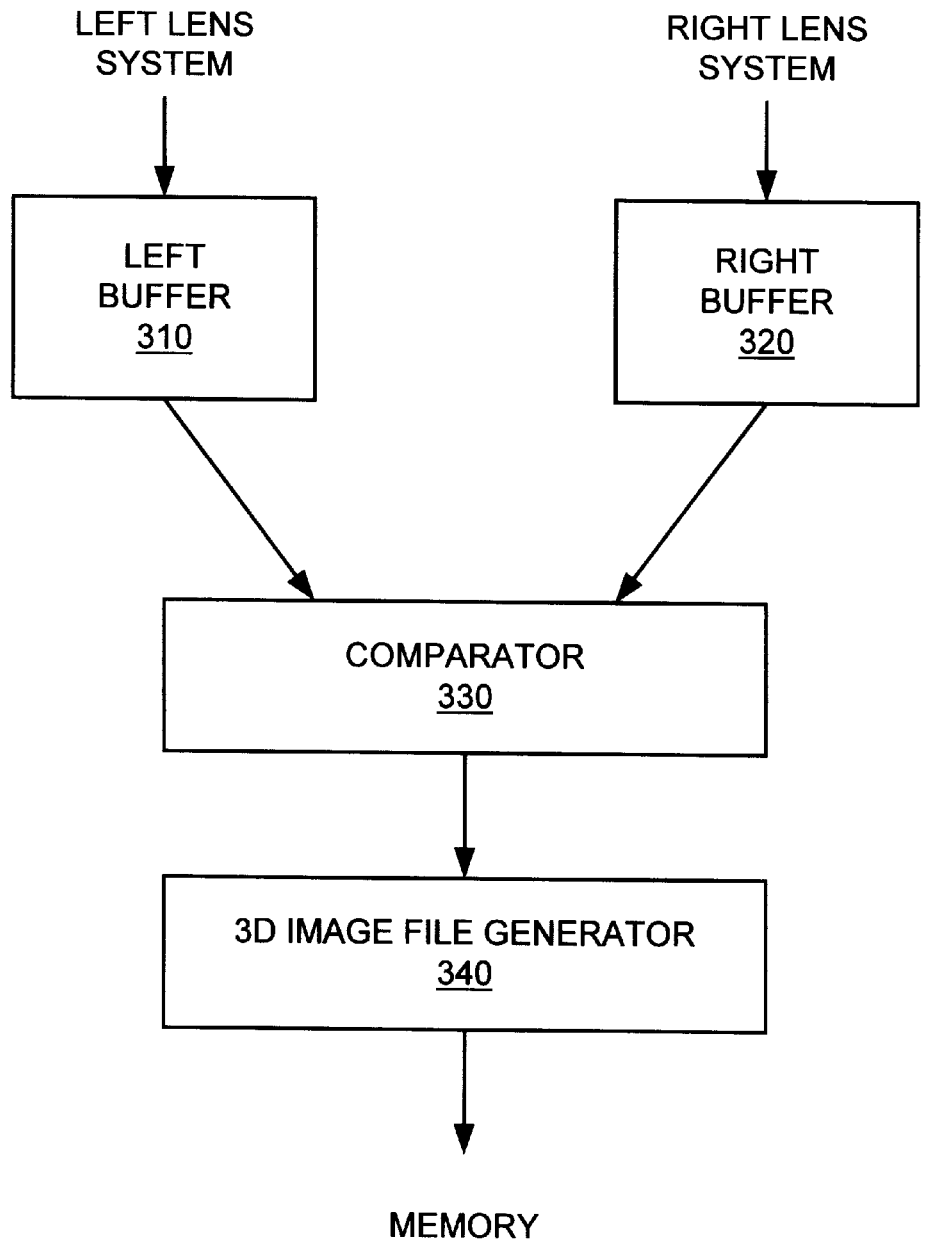
FIG. 3 is an exemplary block diagram of the processing unit of FIG. 2.

FIG. 3 is an exemplary diagram of the processing unit 250. The processing unit 250 includes left and right buffers 310 and 320, a comparator 330, and a 3D image file generator 340. The left and right buffers 310 and 320 receive the left and right eye digital images, respectively, from the A/D units 230 and 240, and temporarily store the images.

The comparator 330 reads the digital images from the left and right buffers 310 and 320 and compares them to extract only the differences between the images. To determine the differences between the two images, the comparator 330 might perform a pixel-by-pixel comparison, noting any differences in pixel values.

The 3D image file generator 340 receives this difference information from the comparator 330 and generates a delta file that includes the difference information. The 3D image file generator 340 also generates a right image file that includes information regarding the right eye digital image. The image file generator 340 then stores the right image file and corresponding delta file as a 3D image file in the memory 260 (FIG. 2).

Returning to FIG. 2, the memory 260 includes a fixed memory device, such as a RAM, or a removable memory device, such as a floppy disk, a recordable disk, or a memory card. The removable memory device permits the 3D image file to be downloaded into a personal computer ("PC").

Figure 4:
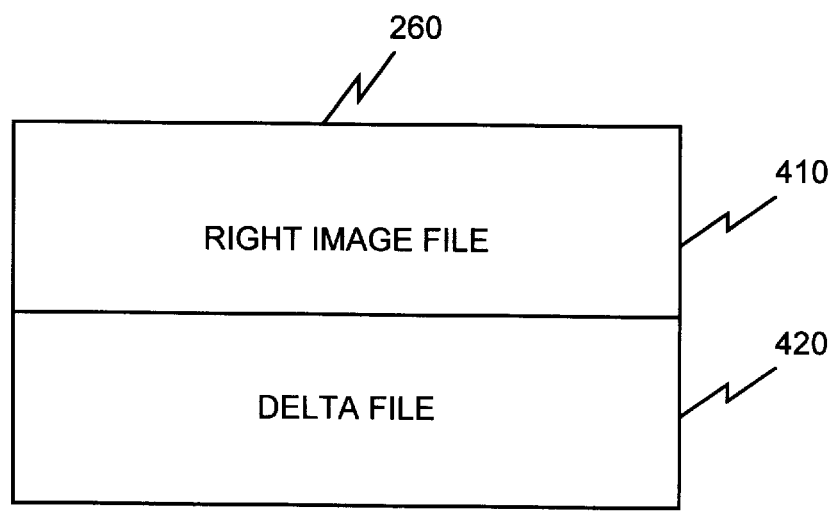
FIG. 4 is an exemplary diagram of the memory of FIG. 2.

FIG. 4 is an exemplary diagram of the memory 260. The memory 260 stores the 3D image file as a right image file 410 and a corresponding delta file 420.

EXEMPLARY PROCESSING FOR STORING A 3D IMAGE

Figure 5:
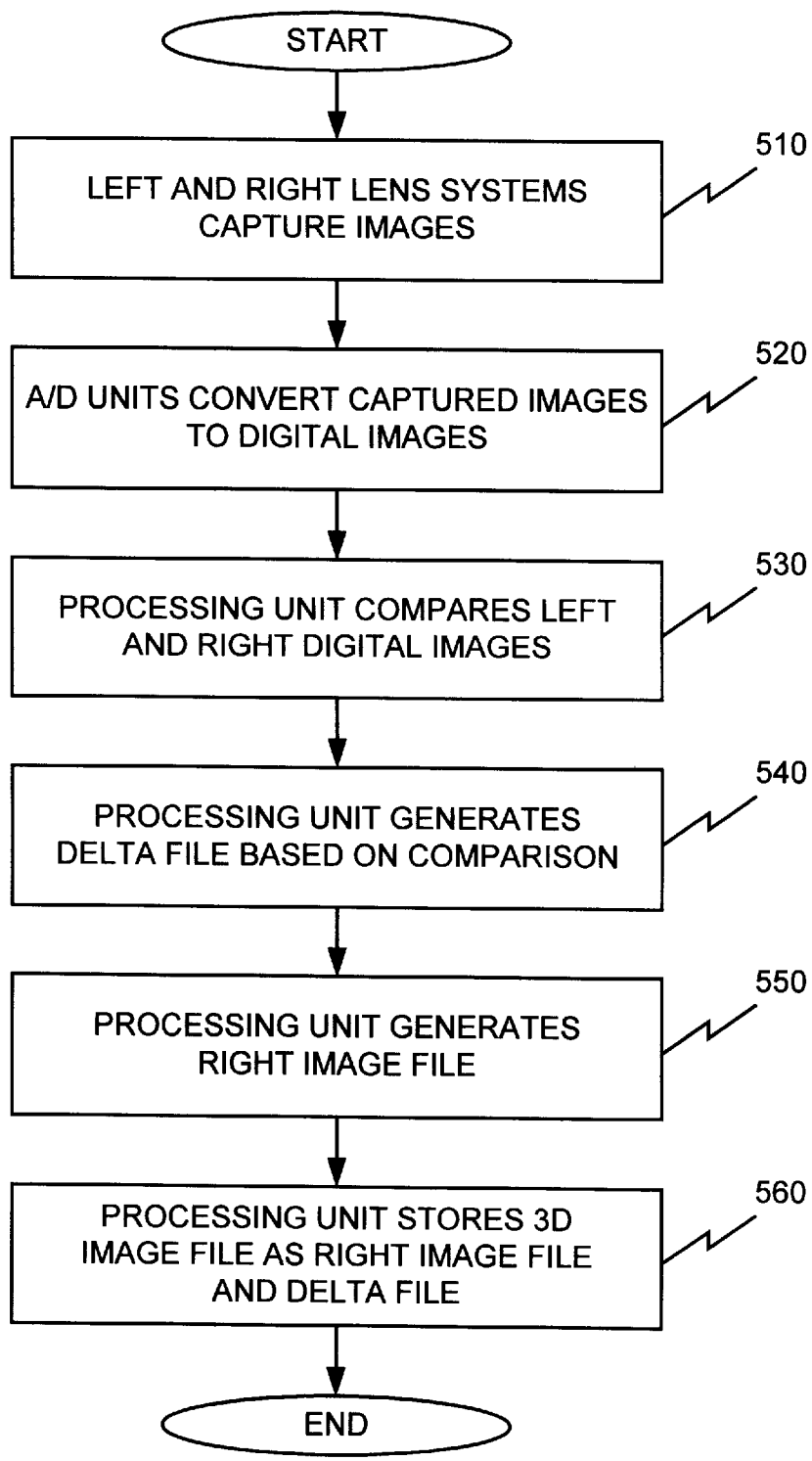
FIG. 5 is a flowchart of 3D image processing by the electronic camera of FIG. 1 to store a 3D image consistent with the present invention.

FIG. 5 is a flowchart of 3D image processing by the electronic camera 100 to store a 3D image. When instructed by a user of the camera 100, the left and right lens systems 210 and 220 capture separate analog images of an object [stage 510]. The A/D units 230 and 240 convert the analog images to digital images [stage 520].

The processing unit 250 compares the digital images to determine differences in the two captured images [stage 530]. The processing unit 250 then generates two files: a right image file and a delta file [stages 540 and 550]. The right image file stores the image captured by the right lens system 220. The delta file stores only the differences between the images captured by the left and right lens systems 210 and 220. The processing unit 250 then stores a 3D image file in the memory 260 as the right image file and the corresponding delta file [stage 560].

EXEMPLARY 3D IMAGE VIEWING DEVICE

Figure 6:
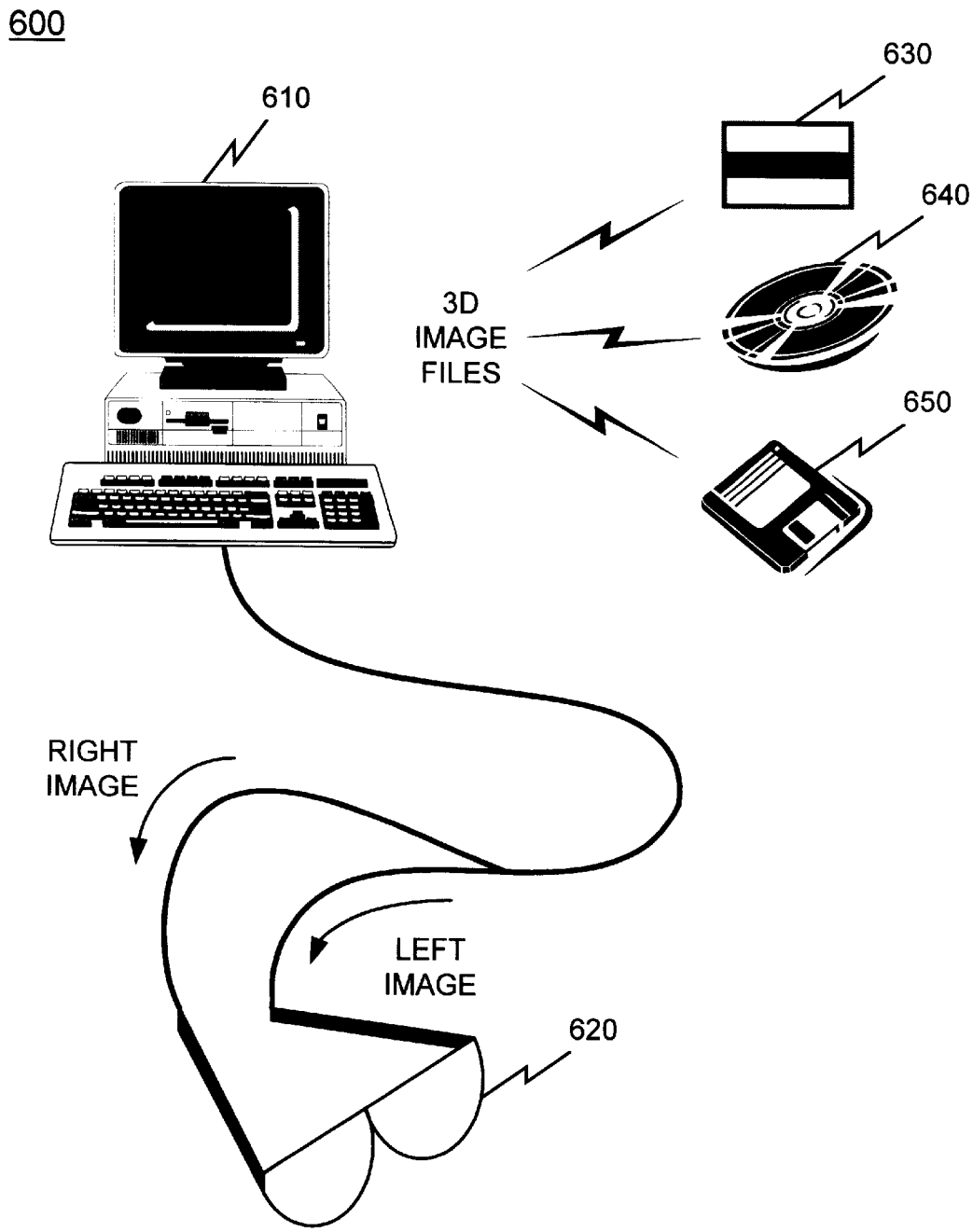
FIG. 6 is an exemplary diagram of a system for viewing a 3D image in a manner consistent with the present invention.

FIG. 6 is a diagram of an exemplary 3D image viewing device 600. The viewing device 600 includes a processing unit, such as a computer 610, and a viewer, such as a pair of LCD goggles 620. The computer 610 is a conventional computer, such an IBM-compatible personal computer ("PC"). The computer 610 receives a 3D image file from a removable memory device, such as a memory card 630, a recordable disk 640, or a floppy disk 650. Of course, the computer 610 may receive the 3D image file by other mechanisms, such as over the Internet, from another computer, from a camera or video system connected to the computer 610, etc.

The ILCD goggles 620 are also a conventional device that permits a user to view a 3D image. The goggles 620 receive two separate images from the computer 610: a right eye image and a left eye image. The goggles 620 display the right eye image to the right eye and the left eye image to the left eye of a user.

Figure 7:
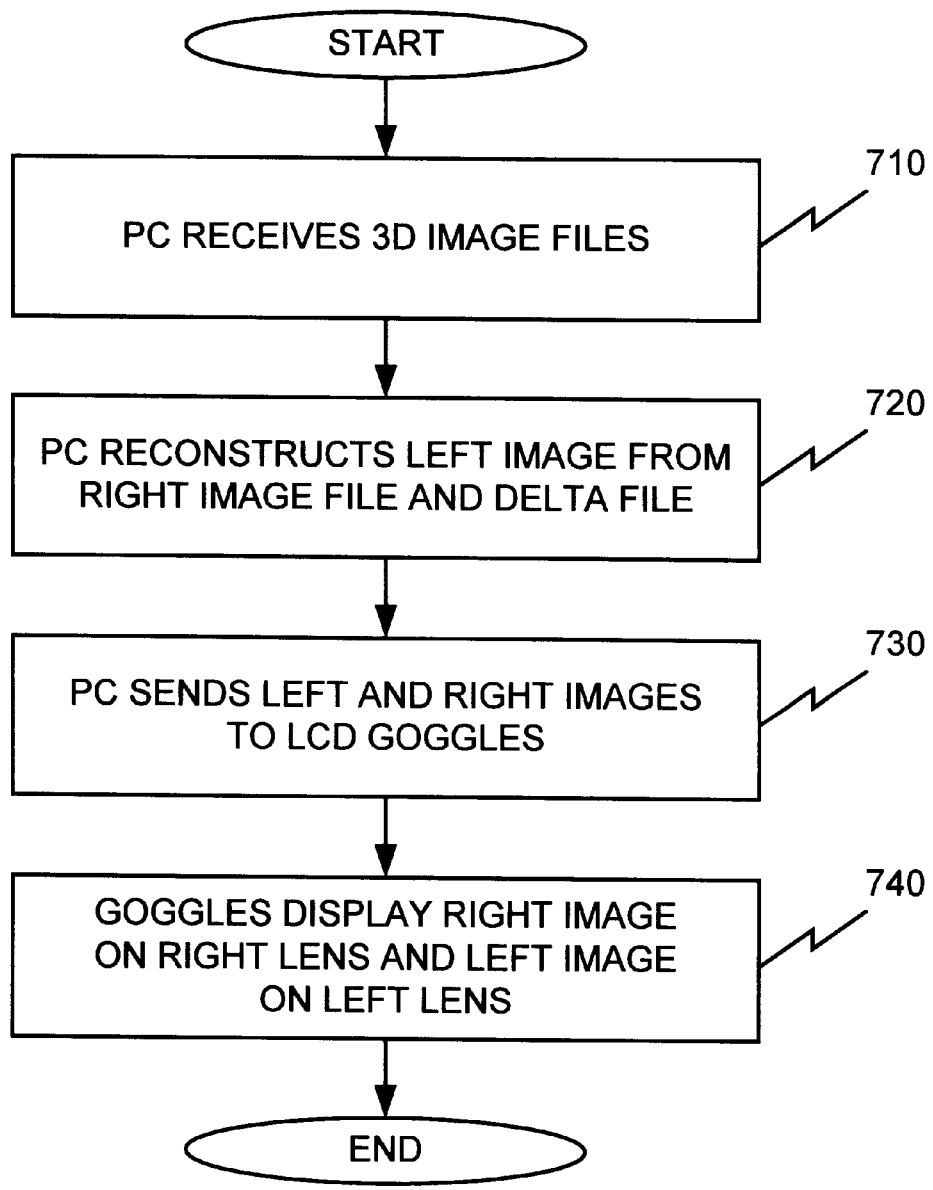
FIG. 7 is a flowchart of 3D image processing by the system of FIG. 6 to display a 3D image consistent with the present invention.

FIG. 7 is a flowchart of 3D image processing by the image viewing device 600 to display a 3D image. The computer 610 receives a 3D image file, including a right image file and a corresponding delta file, from a removable memory device or by other mechanisms [stage 710].

The computer 610 reconstructs the left image from the right image file and the corresponding delta file [stage 720]. The differences stored in the delta file may represent, for example, changes in pixel values, in which case, the computer 610 reconstructs the second image by adjusting the pixel values in the first image file.

The computer 610 then transmits the left and right images to the LCD goggles 620 [stage 730]. The transmission includes instructions for the goggles 620 to display the left image on the left lens and the right image on the right lens. The goggles 620 display the left and right images to the user to create a 3D effect [stage 740].

ANOTHER EXEMPLARY 3D IMAGE VIEWING DEVICE

FIG. 8 is a diagram of another exemplary 3D image viewing device 800. The viewing device 800 includes a processing unit, such as a computer 810, and a viewer, such as a pair of special glasses 820. The computer is a conventional computer, such an IBM-compatible personal computer ("PC"). The computer 810 receives a 3D image from a removable memory device, such as a memory card, a recordable disk, or a floppy disk. Of course, the computer 810 may receive the 3D image by other mechanisms, such as over the Internet, from another computer, from a camera or video system connected to the computer 810, etc.

The special glasses 820 are also a conventional device that permits a user to view a 3D image. The glasses 820 include a red filter for the right lens and a green filter for the left lens.

Figure 9:
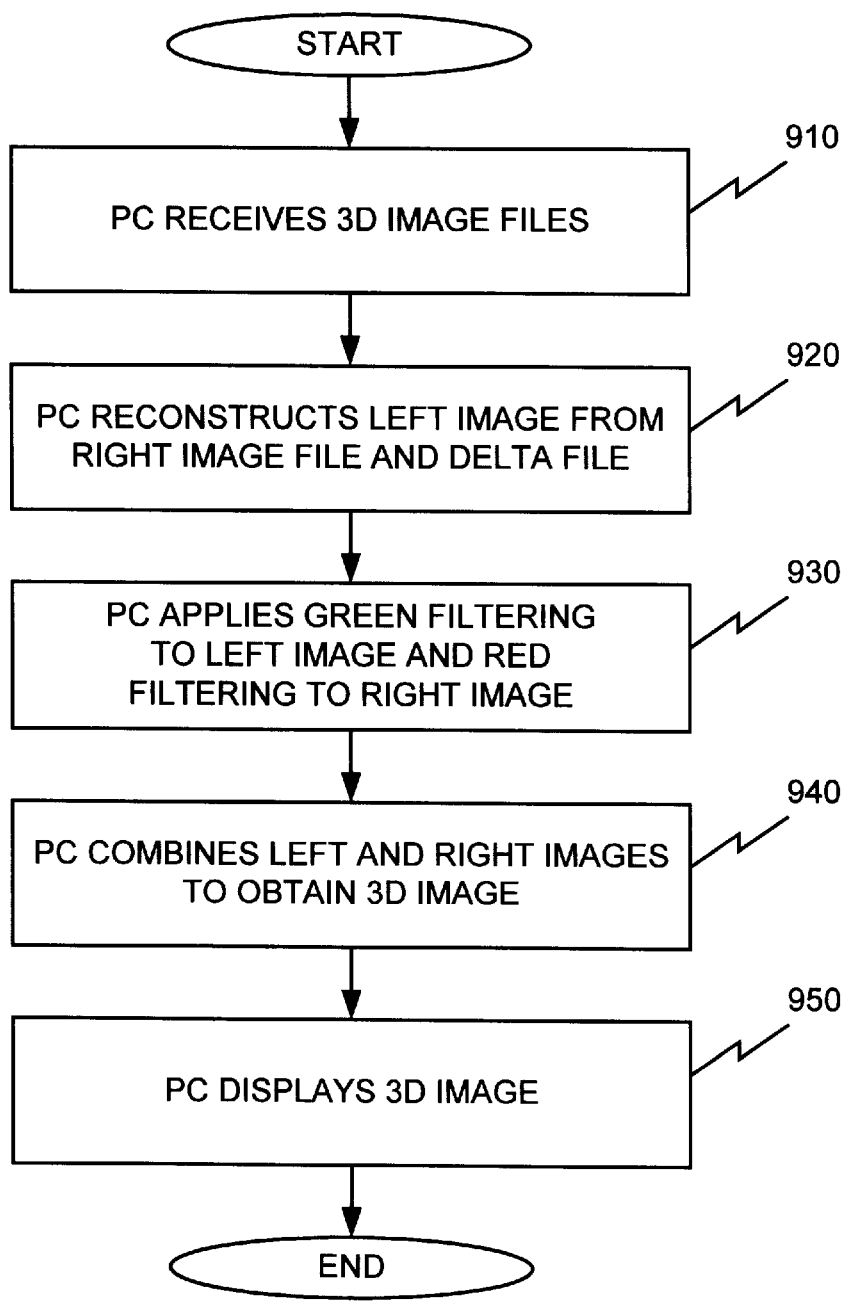
FIG. 9 is a flowchart of 3D image processing by the system of FIG. 8 to display a 3D image consistent with the present invention.

FIG. 9 is a flowchart of 3D image processing by the image viewing device 800 to display a 3D image. The computer 810 receives a 3D image file, including a right image file and a corresponding delta file, from a removable memory device or by other mechanisms [stage 910].

The computer 810 reconstructs the left image from the right image file and the corresponding delta file [stage 920]. The differences stored in the delta file may represent, for example, changes in pixel values, in which case, the computer 810 reconstructs the second image by adjusting the pixel values in the first image file.

The computer 810 then applies green filtering to the left image and red filtering to the right image [stage 930]. The computer 810 then combines the left and right images to obtain a 3D image [stage 940], and displays the image on a monitor [stage 950]. The user uses the special glasses 820 to create a 3D effect.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, the 3D image acquiring device has been described as a digital camera. The device may alternatively be a digital camcorder or similar device. In addition, instead of using red/green filtering, a 3D image viewing device may alternatively use other special filtering for use in security, military, and/or medical training where depth perception is critical.

The scope of the invention is defined by the claims and their equivalents.

What is claimed is:

1. A three-dimensional image acquiring device, comprising:
   a memory;
   a first lens system that captures a first image of an object;
   a second lens system that concurrently captures a second image of the object;
   a comparator that compares the first and second images to determine differences between the first and second images; and
   an image file generator that generates a delta file based on the determined differences, and stores a three-dimensional image file that includes the delta file in the memory.

2. The image acquiring device of claim 1, wherein the first lens system acquires an analog image of the object; and
   wherein the image acquiring device further comprises:
      an analog-to-digital converter that converts the analog image to a digital image.

3. The image acquiring device of claim 1, wherein the second lens system acquires an analog image of the object; and
   wherein the image acquiring device further comprises:
      an analog-to-digital converter that converts the analog image to a digital image.

4. The image acquiring device of claim 1, wherein the image file generator includes:
   means for generating a first image file from the first image, and
   means for generating the three-dimensional image file from the first image file and the delta file.

5. The image acquiring device of claim 1, wherein the comparator includes:
   means for comparing pixels of the first image to pixels of the second image to determine differences between the first and second images.

6. The image acquiring device of claim 1, wherein the image acquiring device is one of a digital camera and a digital camcorder.

7. The image acquiring device of claim 1, wherein the memory includes a removable memory device.

8. A three-dimensional image acquiring system, comprising:
   means for capturing a first image of an object;
   means for concurrently capturing a second image of the object;
   means for comparing the first and second images to determine differences between the first and second images;
   means for generating a delta file based on the determined differences; and
   means for storing a three-dimensional image file that includes the delta file.

9. The image acquiring system of claim 8, wherein the means for capturing a first image includes:
   means for acquiring an analog image of the object; and
   wherein the image acquiring system further comprises:
      means for converting the analog image to a digital image.

10. The image acquiring system of claim 8, wherein the means for concurrently capturing a second image includes:
    means for acquiring an analog image of the object; and
    wherein the image acquiring system further comprises:
       means for converting the analog image to a digital image.

11. The image acquiring system of claim 8, wherein the means for generating a delta file includes:
    means for generating a first image file from the first image, and
    means for generating the three-dimensional image file from the first image file and the delta file.

12. The image acquiring system of claim 8, wherein the means for comparing includes:
    means for comparing pixels of the first image to pixels of the second image to determine differences between the first and second images.

13. The image acquiring system of claim 8, wherein the means for storing includes a removable memory device.

14. A method for acquiring a three-dimensional image, comprising the steps of:
    capturing a first image of an object;
    concurrently capturing a second image of the object;
    comparing the first and second images to determine differences between the first and second images;
    generating a delta file based on the determined differences; and
    storing a three-dimensional image file that includes the delta file.

15. The method of claim 14, wherein the step of capturing a first image includes the substep of:
    acquiring an analog image of the object; and
    wherein the method further comprises the step of:
       converting the analog image to a digital image.

16. The method of claim 14, wherein the step of concurrently capturing a second image includes the substep of:
    acquiring an analog image of the object; and
    wherein the method further comprises the step of:
       converting the analog image to a digital image.

17. The method of claim 14, wherein the step of generating a delta file includes the substeps of:
    generating a first image file from the first image, and
    generating the three-dimensional image file from the first image file and the delta file.

18. The method of claim 14, wherein the step of comparing includes the substep of:

comparing pixels of the first image to pixels of the second image to determine differences between the first and second images.

19. A three-dimensional image viewing system, comprising:

means for receiving a three-dimensional image file, including a first image file and a delta file, the delta file storing differences between first and second images of an object;

means for reconstructing the second image from the first image file and the delta file; and means for separately presenting the first and second images to a user.

20. The viewing system of claim 19, wherein the means for separately presenting includes:

means for displaying the first image on a first lens and the second image on a second lens of a pair of viewing goggles.

21. The viewing system of claim 20, further comprising:

means for generating instructions for the goggles to display the first image on the first lens and the second image on the second lens, and means for sending the instructions to the goggles along with the first and second images.

22. The viewing system of claim 19, wherein the means for receiving includes:

means for reading the three-dimensional image file from a removable memory device.

23. The viewing system of claim 19, wherein the means for receiving includes:

means for obtaining the three-dimensional image file from the Internet.

24. The viewing system of claim 19, wherein the means for receiving includes:

means for obtaining the three-dimensional image file from an image acquiring device.

25. A method for viewing a three-dimensional image, comprising the steps of:

receiving a three-dimensional image file, including a first image file and a delta file, the delta file storing differences between first and second images of an object;

reconstructing the second image from the first image file and the delta file; and presenting the first and second images to a user.

26. The method of claim 25, wherein the presenting step includes the substep of:

displaying the first image on a first lens and the second image on a second lens of a pair of goggles.

27. The method of claim 25, wherein the step of receiving includes the substep of:

reading the three-dimensional image file from a removable memory device.

28. The method of claim 25, wherein the step of receiving includes the substep of:

obtaining the three-dimensional image file from the Internet.

29. The method of claim 25, wherein the step of receiving includes the substep of:

obtaining the three-dimensional image file from an image acquiring device.

30. A computer program product having instructions stored on a memory device for causing a computer to perform a method comprising the steps of:

receiving a three-dimensional image file, including a first image file and a delta file, the delta file storing differences between first and second images of an object;

reconstructing the second image from the first image file and the delta file; and separately presenting the first and second images to a user.

31. A three-dimensional image viewing system, comprising:

means for receiving a three-dimensional image file, including a first image file and a delta file, the delta file storing differences between first and second images of an object;

means for reconstructing the second image from the first image file and the delta file;

means for combining the first and second images to obtain a three-dimensional image; and means for displaying the three-dimensional image to a user.

32. The viewing system of claim 31, further comprising:

means for applying a first color filtering to the first image and a second color filtering to the second image before combining the first and second images.

33. The viewing system of claim 31, wherein the means for receiving includes:

means for reading the three-dimensional image file from a removable memory device.

34. The viewing system of claim 31, wherein the means for receiving includes:

means for obtaining the three-dimensional image file from the Internet.

35. The viewing system of claim 31, wherein the means for receiving includes:

means for obtaining the three-dimensional image file from an image acquiring device.

36. A method for viewing a three-dimensional image, comprising the steps of:

receiving a three-dimensional image file, including a first image file and a delta file, the delta file storing differences between first and second images of an object;

reconstructing the second image from the first image file and the delta file;

combining the first and second images to obtain a three-dimensional image; and displaying the three-dimensional image to a user.

37. The method of claim 36, further comprising the step of:

applying a first color filtering to the first image and a second color filtering to the second image before combining the first and second images.

38. The method of claim 36, wherein the step of receiving includes the substep of:

reading the three-dimensional image file from a removable memory device.

39. The method of claim 36, wherein the step of receiving includes the substep of:

obtaining the three-dimensional image file from the Internet.

40. The method of claim 36, wherein the step of receiving includes the substep of:

obtaining the three-dimensional image file from an image acquiring device.

41. A computer program product having instructions stored on a memory device for causing a computer to perform a method comprising the steps of:
- receiving a three-dimensional image file, including a first image file and a delta file, the delta file storing differences between first and second images of an object;
- reconstructing the second image from the first image file and the delta file;
- combining the first and second images to obtain a three-dimensional image; and
- displaying the three-dimensional image to a user.

42. A system for capturing and viewing a three-dimensional image, comprising:
- means for capturing a first image of an object;
- means for concurrently capturing a second image of the object;
- means for comparing the first and second images to determine differences between the first and second images;
- means for generating a delta file based on the determined differences;
- means for storing a three-dimensional image file that includes the delta file;
- means for reconstructing the second image from the first image and the delta file; and
- means for presenting the first and second images to a user.

43. A system for capturing and viewing a three-dimensional image, comprising:
- means for capturing a first image of an object;
- means for concurrently capturing a second image of the object;
- means for comparing the first and second images to determine differences between the first and second images;
- means for generating a delta file based on the determined differences;
- means for storing a three-dimensional image file that includes the delta file;
- means for reconstructing the second image from the first image and the delta file;
- means for combining the first and second images to obtain a three-dimensional image; and
- means for displaying the three-dimensional image to a user.

* * * * *